(12) United States Patent
Hwang

(10) Patent No.: US 9,070,928 B2
(45) Date of Patent: Jun. 30, 2015

(54) HIGH TEMPERATURE-PROOF DEVICE FOR LITHIUM BATTERY

(76) Inventor: Hong-Wen Hwang, Hsinchu (TW)

(*) Notice: Subject to any disclaimer, the term of this patent is extended or adjusted under 35 U.S.C. 154(b) by 680 days.

(21) Appl. No.: 13/346,784

(22) Filed: Jan. 10, 2012

(65) Prior Publication Data
US 2013/0177785 A1    Jul. 11, 2013

(51) Int. Cl.
*H01M 2/12* (2006.01)
*H01M 10/052* (2010.01)

(52) U.S. Cl.
CPC .......... *H01M 2/1241* (2013.01); *H01M 10/052* (2013.01)

(58) Field of Classification Search
CPC ............ H01M 2/1282; H01M 2/1205; H01M 2/1235; H01M 2/1252; H01M 2/1276
See application file for complete search history.

(56) References Cited

U.S. PATENT DOCUMENTS

2006/0024574 A1* 2/2006 Yim et al. ...................... 429/174
2013/0059181 A1* 3/2013 Leport et al. ................... 429/89

* cited by examiner

*Primary Examiner* — Patrick Ryan
*Assistant Examiner* — Wyatt McConnell
(74) *Attorney, Agent, or Firm* — Rosenberg, Klein & Lee

(57) ABSTRACT

The present invention discloses a high temperature-proof device for a lithium battery, which is installed in a casing of a lithium battery. The casing has a sealing board on one face thereof. The sealing board has at least one through-hole where a pressure relief module is installed. The pressure relief module has a top cover protruding from the sealing board. The top cover has at least one exhaust hole and an engagement member arranged inside the top cover. The engagement member has a first exhaust channel. A low-melting point compound is arranged inside the first exhaust channel. The present invention releases the high-temperature gas generated by inappropriate chemical or electric reaction inside a lithium battery. Thus, the present invention can prevent a lithium battery from burning or explosion caused by the high-temperature gas. Therefore, the present invention can effectively promote safety of lithium batteries.

5 Claims, 4 Drawing Sheets

HIGH TEMPERATURE-PROOF DEVICE FOR LITHIUM BATTERY

BACKGROUND OF THE INVENTION

1. Field of the Invention

The present invention relates to a lithium battery, particularly to a high temperature-proof device for a lithium battery.

2. Description of the Related Art

Although lithium batteries have advantages of high energy conversion efficiency, long service life and superior stability, the content thereof is likely to be denatured by weathering, dramatic temperature variation, or collision. The denatured content may cause the internal temperature to rise or even cause explosion. Therefore, the designers of lithium batteries must take much care in safety problems.

Refer to FIG. 1 and FIG. 2 for a conventional safety device of a lithium battery. In the prior, a pressure relief device 50 is installed on one face of a lithium battery 52. A sealing board 54 is arranged on the same face of the lithium battery 52. The sealing board 54 has at least one through-hole 56 where a pressure relief module 58 is arranged. The pressure relief module 58 comprises a top cover 60. The top cover 60 has at least one exhaust hole 62 at two ends thereof. An engagement member 64 is secured inside the top cover 60. A pressure relief valve 66 is arranged inside the engagement member 64. The pressure relief valve 66 has an annular trench 68. The pressure the annular trench 68 can withstand is smaller than that the surrounding material can do. Once the pressure of the lithium battery 52 exceeds a specified value, the annular trench 68 will break firstly. Thus is detached the pressure relief valve 66 and released the pressure. The prior art can indeed prevent from too high a pressure inside a lithium battery. However, the prior art cannot prevent a lithium battery from explosion caused by too high a temperature.

Accordingly, the present invention proposes a high temperature-proof device for a lithium battery to overcome the abovementioned problem.

SUMMARY OF THE INVENTION

The primary objective of the present invention is to provide a high temperature-proof device for a lithium battery, which can prevent a lithium battery from burning or explosion caused by high-temperature internal gas generated by inappropriate chemical or electric reaction, whereby is enhanced the safety of the lithium battery.

Another objective of the present invention is to provide a high temperature-proof device for a lithium battery, which can prevent the components from being loosened by vibration generated in transportation of the lithium battery.

A further objective of the present invention is to provide a high temperature-proof device for a lithium battery, which is simple-structured and easy to assemble, and which can be fabricated in low cost and high efficiency.

To achieve the abovementioned objectives, the present invention proposes a high temperature-proof device for a lithium battery, which is installed in a casing of a lithium battery. The casing has a sealing board on one face thereof. The sealing board has a least one through-hole where a pressure relief module is installed. The pressure relief module has a top cover protruding from the sealing board. The top cover has at least one exhaust hole and an engagement member arranged inside the top cover. The engagement member has a first exhaust channel. A low-melting point compound is arranged inside the first exhaust channel.

Below, the embodiments are described in detail in cooperation with drawings to make easily understood the structural characteristics and efficacies of the present invention.

DETAILED DESCRIPTION OF THE INVENTION

Figure 1:
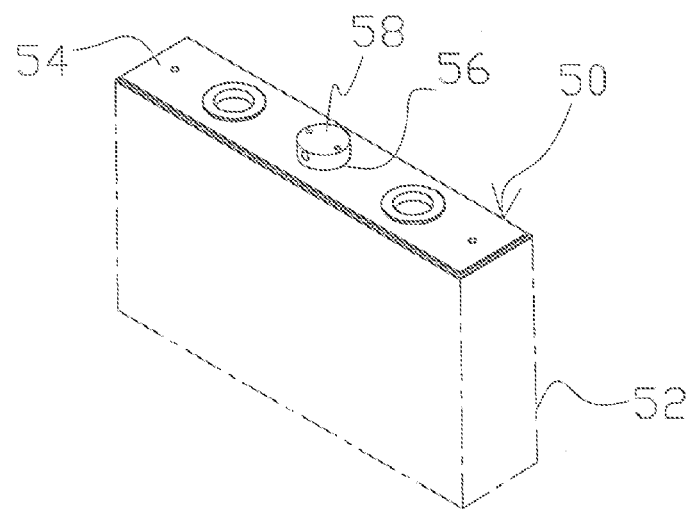
FIG. 1 shows a conventional lithium battery.
Figure 2:
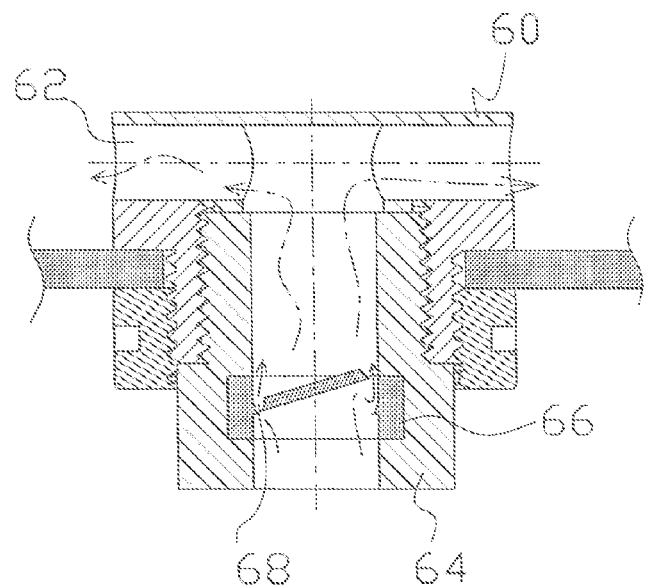
FIG. 2 shows a conventional pressure relief device of a lithium battery.
Figure 3:
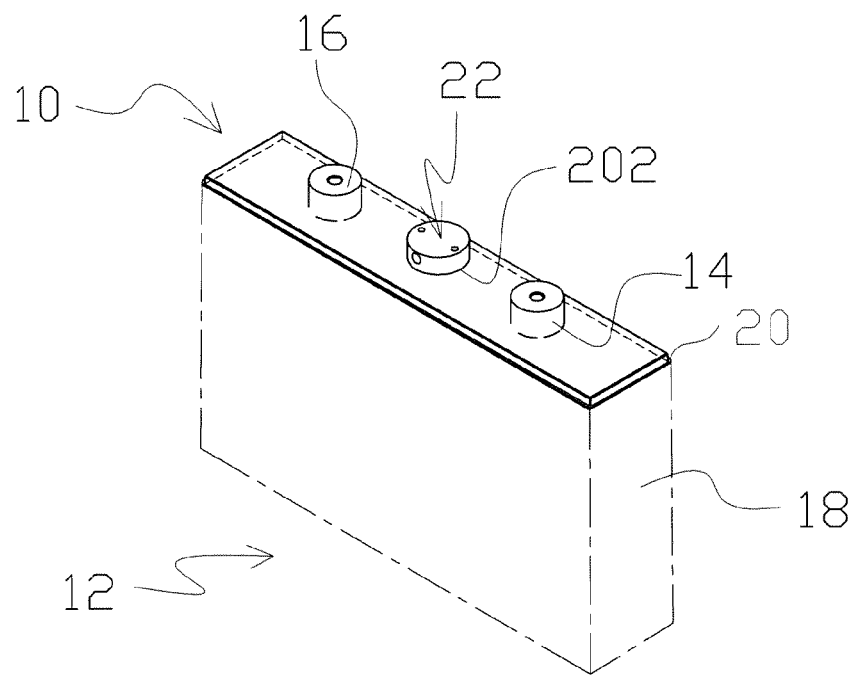
FIG. 3 schematically shows a lithium battery according to some embodiments of the present invention.

Refer to FIG. 3. In some embodiments, the high temperature-proof device 10 of the present invention is installed in a lithium battery 12. The lithium battery 12 has a battery core (not shown in the drawings), a positive electrode 14, a negative electrode 16, and a casing 18 encapsulating the battery core, wherein the positive electrode 14 and the negative electrode 16 extend from the battery core. The casing 18 is made of a rigid metallic material lest the lithium battery 12 be damaged by collision. The casing 18 has a sealing board 20 on one face thereof. The sealing board 20 is also made of a rigid metallic material and joined with the casing 18 via a laser welding technology or an ultrasonic welding technology.

Figure 4:
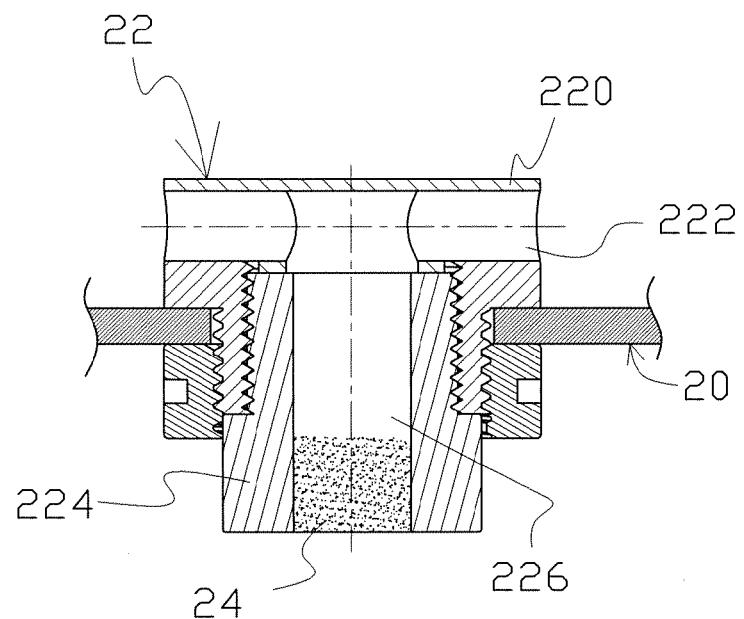
FIG. 4 is a sectional view schematically shows a high temperature-proof device for a lithium battery according to a first embodiment of the present invention.
Figure 5:
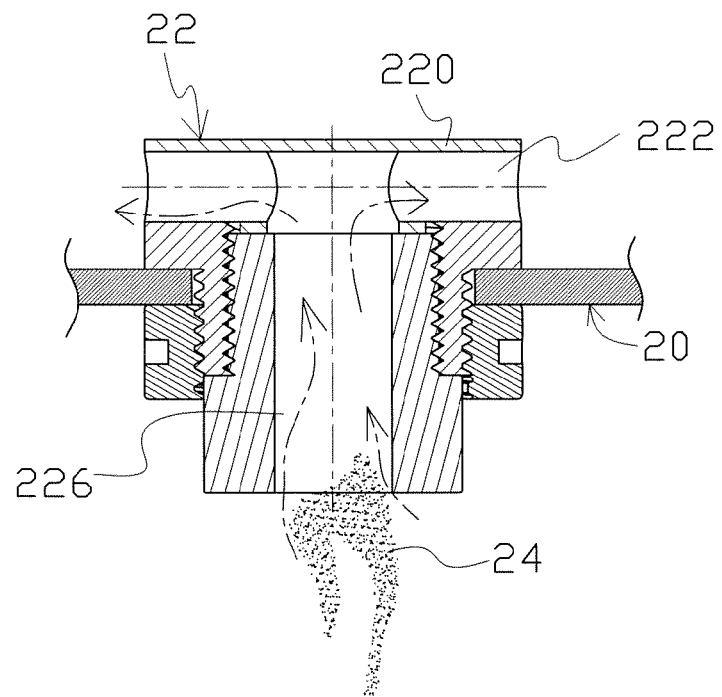
FIG. 5 is a sectional view schematically shows the response of a high temperature-proof device to the high-temperature gas inside a lithium battery according to the first embodiment of the present invention.

Refer to FIG. 3 again, and refer to FIG. 4 for a first embodiment of the present invention. The sealing board 20 is arranged on one face of the casing 18. The sealing board 20 has at least one through-hole 202 where a pressure relief module 22 passes through the sealing board 20. The pressure relief module 22 comprises a top cover 220 made of a metallic material. The top cover 220 has at least one exhaust hole 222. The top cover 220 protrudes from the sealing board 20, and an engagement member 224 is fixed to the interior of the top cover 220. The pressure relief module 22 is fixed to the sealing board 20 with a fastening member or with a welding method. The engagement member 224 has a first exhaust channel 226 where a low melting point compound 24 is filled. The low melting point compound 24 is a material having a melting point lower than that of the rubber material of the engagement member 224, such as an alloy containing aluminum, indium, bismuth, lead and cadmium. While the internal temperature of the lithium battery 12 rises, the low melting point compound 24 will melt before the melting of the engagement member 224, as shown in FIG. 5. Thereby, the first exhaust channel 226 is opened. Thus, the high-temperature gas flows from the interior of the lithium battery 12 through the first exhaust channel 226 to the exhaust hole 222. Then, the high-temperature gas is exhausted from the exhaust hole 222. Consequently is lowered the internal temperature of the lithium battery 12. The engagement member 224 is made of a rubber material, which is soft and able to absorb vibration caused by transportation of the lithium battery 12. Therefore is reduced the vibration conducted to the pressure relief module 22 and the low melting point compound 24 inside the first exhaust channel 226. Thus, the low melting point compound 24 is unlikely to loosen or drop.

Figure 6:
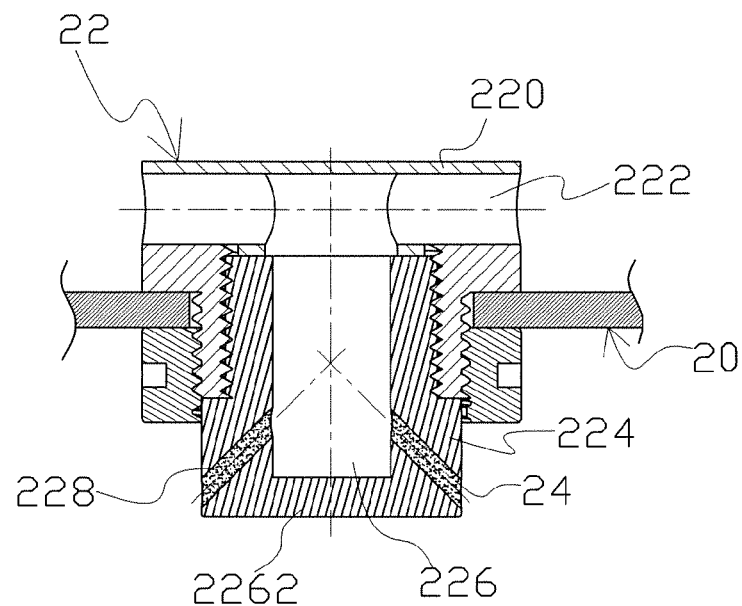
FIG. 6 is a sectional view schematically shows a high temperature-proof device for a lithium battery according to a second embodiment of the present invention.
Figure 7:
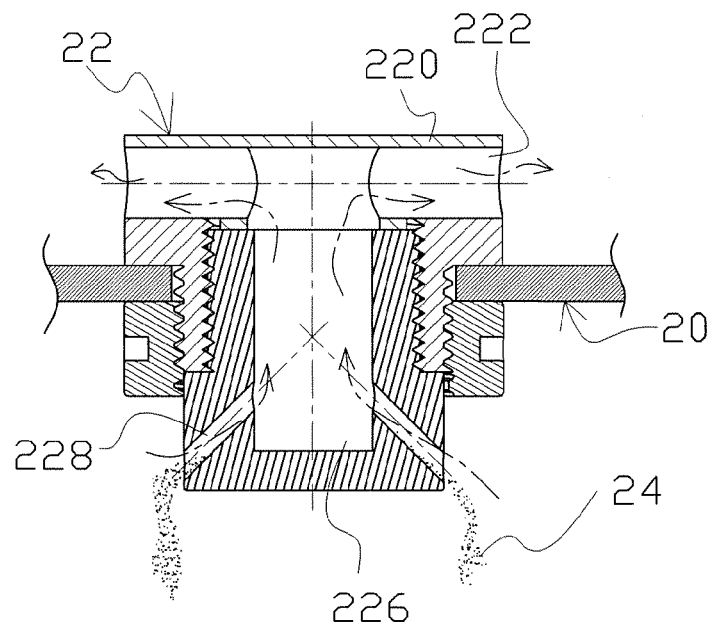
FIG. 7 is sectional view schematically shows the response of a high temperature-proof device to the high-temperature gas inside a lithium battery according to the second embodiment of the present invention.

Refer to FIG. 6 for a second embodiment of the present invention. In the second embodiment, the engagement member 224 has at least one second exhaust channel 228. In the second embodiment, the first exhaust channel 226 has a sealed end 2262 to prevent that the high temperature gas inside the casing 18 flows out from the first exhaust channel 226 or the heat energy inside the casing 18 radiates from the first exhaust channel 226. In FIG. 6, the engagement member 224 has two second exhaust channels 228 interconnecting with the casing 18 and the first exhaust channel 226 and filled with at least one low melting point material 24. While the internal temperature of the lithium battery 12 exceeds a specified value, the low melting point material 24 melts, and the second exhaust channels 228 are opened, as shown in FIG. 7. Thus, the heat energy inside the lithium battery 12 is released through the second exhaust channels 228 and the first exhaust channel 226 to the exhaust hole 222 and then exhausted from the exhaust hole 222. Consequently is lowered the internal temperature of the lithium battery 12.

In conclusion, the present invention is applied to a lithium battery and able to prevent the components of the lithium battery from being loosened by vibration. Further, the present invention uses a low melting point compound to effectively control the internal temperature of a lithium battery. The present invention can exempt a lithium battery from burning or explosion caused by the internal high-temperature gas generated in an inappropriate chemical or electric reaction. The present invention can fully guarantee the safety of the lithium battery. The present invention is simple-structure and easy to assemble and thus can be fabricated in low cost.

The embodiments described above are only to exemplify the present invention but not to limit the scope of the present invention. Any equivalent modification or variation according to the characteristic or spirit of the present invention is to be also included within the scope of the present invention.

What is claimed is:

1. A high temperature-proof device for a lithium battery, comprising:
    a lithium battery including a battery core;
    a casing encapsulating the battery core, said casing having multiple faces;
    a sealing board installed at one of said faces of said casing, said sealing board having at least one through-hole;
    a top cover protruding from said sealing board, wherein said top cover having at least one exhaust hole;
    an engagement member being fixed to an interior of said top cover and having a longitudinally extending axis, said engagement member having an axially extended first exhaust channel and at least one second exhaust channel extending transversely and obliquely with respect to said axis of said engagement member, said first exhaust channel being in fluid communication with said at least one exhaust hole and said at least one second exhaust channel being in fluid communication with said first exhaust channel; and
    a low melting point material wholly contained within said at least one second exhaust channel, said low melting point material having a melting point lower than that of said engagement member.

2. The high temperature-proof device for a lithium battery according to claim 1, wherein said first exhaust channel has a sealed end.

3. The high temperature-proof device for a lithium battery according to claim 1, wherein said engagement member is made of a rubber material.

4. The high temperature-proof device for a lithium battery according to claim 1, wherein said low melting point material is made of an alloy containing at least one of aluminum, indium, bismuth, lead and cadmium.

5. The high temperature-proof device for a lithium battery according to claim 3, wherein said low melting point material is made of an alloy containing at least one of aluminum, indium, bismuth, lead and cadmium.

* * * * *